(12) United States Patent
Gonneaud et al.

(10) Patent No.: US 8,671,833 B2
(45) Date of Patent: Mar. 18, 2014

(54) APPARATUS FOR EXTRACTING JUICE AND PULP FROM VEGETABLE PRODUCTS FOR LARGE INTRODUCTIONS AND ASSOCIATED STRAINING

(75) Inventors: Patrick Gonneaud, Saint Romain sous Gourdon (FR); Jean-Pierre Lazzer, Montchanin (FR)

(73) Assignee: Hameur S.A., Luxembourg (LU)

( * ) Notice: Subject to any disclaimer, the term of this patent is extended or adjusted under 35 U.S.C. 154(b) by 861 days.

(21) Appl. No.: 12/020,885

(22) Filed: Jan. 28, 2008

(65) Prior Publication Data

US 2008/0173189 A1 Jul. 24, 2008

(30) Foreign Application Priority Data

Jan. 24, 2007 (FR) ...................................... 07 52864

(51) Int. Cl.
*B26D 1/00* (2006.01)
*B02C 15/00* (2006.01)
*B04B 5/10* (2006.01)

(52) U.S. Cl.
USPC .............................................. 99/511; 99/512

(58) Field of Classification Search
USPC .................................... 99/511, 512, 485, 495
See application file for complete search history.

(56) References Cited

U.S. PATENT DOCUMENTS

| 2,527,695 | A | * | 10/1950 | Bennett | 99/511 |
| 3,106,948 | A | * | 10/1963 | Staeger | 99/512 |
| 4,688,478 | A | * | 8/1987 | Williams | 99/503 |
| 6,959,636 | B2 | * | 11/2005 | Graziano | 83/857 |
| 2005/0235839 | A1 | * | 10/2005 | Lin | 99/511 |

FOREIGN PATENT DOCUMENTS

DE 1060113 B 6/1959
FR 1155634 A 5/1958

* cited by examiner

*Primary Examiner* — Henry Yuen
*Assistant Examiner* — Hemant Mathew
(74) *Attorney, Agent, or Firm* — Perman & Green, LLP

(57) ABSTRACT

An apparatus for extraction of juice and pulp from a food product includes a base enclosing an electric motor from which extends a rotating drive shaft, a tank fixed on the base and transpierced by the drive shaft, an entry spout for the food product, a strainer set in the tank and being supported and spun by the drive shaft, the strainer comprising a radial wall perforated by several holes and a solid bottom, such that the food product is in contact with the bottom and the wall and passes through the holes, and a food pusher which can be inserted in the spout, the food product being held against the bottom of the strainer by the food pusher in order to extract from this food product its juice which is collected in the tank situated underneath the strainer, wherein the bottom of the strainer comprises a shape of an ascending or descending staircase.

2 Claims, 2 Drawing Sheets

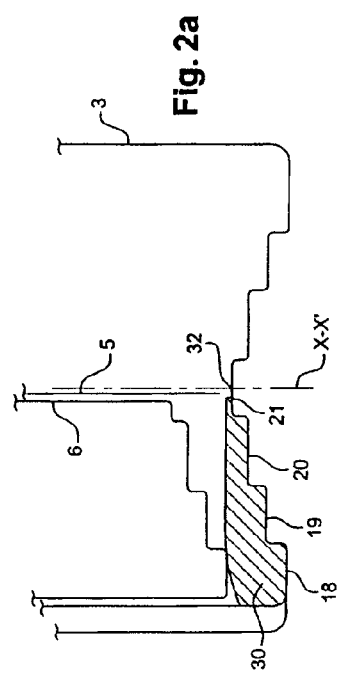
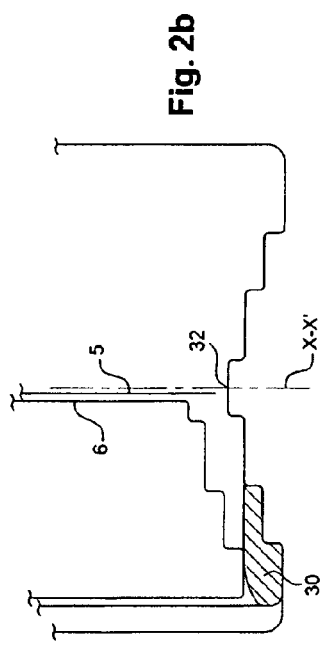
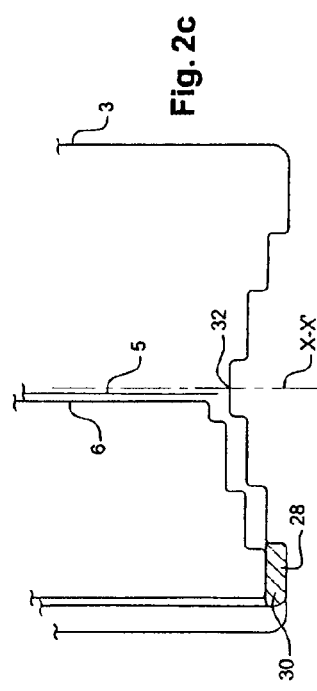

APPARATUS FOR EXTRACTING JUICE AND PULP FROM VEGETABLE PRODUCTS FOR LARGE INTRODUCTIONS AND ASSOCIATED STRAINING

CROSS-REFERENCE TO RELATED APPLICATIONS

This application claims the benefit of French Application No. 07 52864, Jan. 24, 2007.

BACKGROUND

1. Field

The disclosed embodiments relate to a centrifugal or extraction apparatus for extracting juice and pulp from food or vegetable products. The term "vegetable products" is understood to mean fruits such as apples, pears, strawberries and bananas etc. The term "vegetables" is also understood to mean vegetables such as potatoes, carrots, radishes and turnips etc. The aim of the disclosed embodiments is to make the use of such an apparatus easier. The disclosed embodiments relate to the domain of food products and food processing apparatus.

2. Brief Description

A juice extractor comprises a tank, a cylindrical strainer with an X-X' symmetrical axis, a base and a food pusher. The base encloses an electric motor which spins a drive shaft which extends outside the base. The tank is fixed on the base and is transpierced by the drive shaft. The strainer is suspended in the tank being supported and spun around the X-X' axis by the drive shaft. The food pusher forces the vegetable products in the strainer into contact with a bottom of the strainer.

In the state of the art a juice extractor is known which comprises a strainer having a radial wall and a bottom. The radial wall is pierced with holes and the bottom is solid. This bottom presents means for shredding products introduced into the juice extractor on an internal face of the strainer. These means for shredding grate the products. The products thus grated are then expulsed, by centrifugal force, in the direction of and through the radial wall with a view to extracting their juice. The advantage of this juice extractor is that the juice obtained is pure and that the output is high.

However, the pips, the pieces of skin, the fibres and the residues stick against the radial wall of the strainer and spin with the strainer. A residue is the last remaining piece of the vegetable product after processing. The juice extractor works with the food pusher which remains still and the strainer which spins. To avoid the food pusher from scraping against the spinning strainer and to prevent them from damaging each other, there must be room for manoeuvre between the food pusher and the strainer. Thus, because of this room for manoeuvre, the vegetable product residues appear at the surface of the strainer after complete insertion of the food pusher into the spout.

However, the presence of these residues causes an imbalance in the spinning strainer. The spinning of the strainer coated in these residues causes the juice extractor to vibrate. These vibrations cause the juice extractor to move when it is being used.

Another type of juice extractor is known which is has a spout which is relatively narrow. The term relatively narrow is understood to mean that the spout permits the introduction of vegetable products which are cut up and/or in small sizes. Such a juice extractor makes it possible to obtain small sized residues. The term small sized residues is understood to mean that the presence of such residues does not cause the juice extractor to vibrate when it is being used. But the pre-cutting of vegetable products into several pieces is time consuming for the user of the juice extractor.

Yet another juice extractor exists which includes a strainer with a radial wall which forms a truncated part, of which the narrowest part of the cone is situated close to the bottom of the strainer. This radial wall is perforated in such a manner as to allow the juice but not the fibre of the food products to pass through it. The bottom of the strainer is flat and serrated. The bottom of the strainer is formed like a cheese grater. The vegetable products are pressed against this bottom by the food pusher to be grated by this said bottom in such a way as to extract the juice from these products. The advantage presented by this juice extractor is that fruit pulp for example does not remain in the strainer; it is extracted to a bowl situated next to the tank. By contrast, the juice is not pure and the output is poor.

SUMMARY

To solve these problems, the disclosed embodiments make provision for a modification in the shape of the bottom of the strainer in such a way as to obtain smaller residues from whole, uncut vegetable products. The resulting residues are of a size such as will not cause the juice extractor to vibrate when it is in use. The section of the spout can be as large as the section of the strainer.

The juice extractor, according to the disclosed embodiments, presents a perforated radial wall and a solid bottom which does not allow products to pass through it. In the disclosed embodiments, the bottom of the strainer presents a stepped shape, that is to say that the bottom of the strainer is in the shape of a staircase. The bottom of the strainer comprises several levels. The bottom of the strainer can be made up of 2, 3, 4, 5, 6, 7 . . . levels, in the form of an ascending or descending staircase, in a completely random way. The term in the shape of an ascending staircase is understood to mean that the bottom of the strainer is successively raised from an edge of the strainer towards a centre of this strainer in relation to a flat surface in which extends a work table on which the juice extractor is placed in its normal functioning position. The term in the shape of a descending staircase is understood to mean that the bottom of the strainer is successively raised from the centre of this strainer towards the edge of the said strainer in relation to the flat surface of the work table.

The food pusher can be of a shape which is complementary with that of the bottom of the strainer. As and when the food pusher is inserted in the spout, the vegetable product is reduced to at least a residue whose size is reduced to that of the width of the level which is nearest to the external edge of the strainer bottom.

The juice extractor, according to the disclosed embodiments, permits the introduction of whole vegetable products, without the necessity for pre-cutting them into several pieces before inserting them into the spout.

The juice extractor according to the disclosed embodiments permits the user to save time.

The juice extractor according to the disclosed embodiments is easy to use.

The object of the disclosed embodiments is therefore an apparatus for extracting juice and pulp from food products comprising a base enclosing an electric motor from which extends a rotating drive shaft, a tank fixed on the base and transpierced by the drive shaft, an entry spout for the food product, a strainer set in the tank and being supported and spun by the drive shaft, the strainer comprising a radial wall perforated by several holes and a solid bottom, the food product being destined to be in contact with the bottom and the wall and pass through the holes, and a food pusher which can be inserted in the spout, the food product being held against the bottom of the strainer by the food pusher in order to extract from this food product its juice which is collected in the tank situated underneath the strainer, characterised in that The bottom of the strainer is stair-shaped.

The object of the disclosed embodiments is also a strainer of an apparatus for extracting juice and pulp from food products, the strainer comprising a radial wall and a bottom, the wall of the strainer being pierced by holes through which the food product is designed to pass after the pressing of said food product against the wall of the strainer, the bottom of the strainer being solid, characterised in that the bottom of the strainer is stair-shaped.

BRIEF DESCRIPTION OF THE DRAWINGS

The disclosed embodiments will be more easily understood when reading the following description and studying the accompanying drawings. These are provided as an illustration and are in no way limitative to the disclosed embodiments. These figures show:

FIGS. 2a to 2c: schematic representations of the steps of processing a vegetable product by an extraction apparatus, according to the disclosed embodiments.

DETAILED DESCRIPTION

Figure 1:
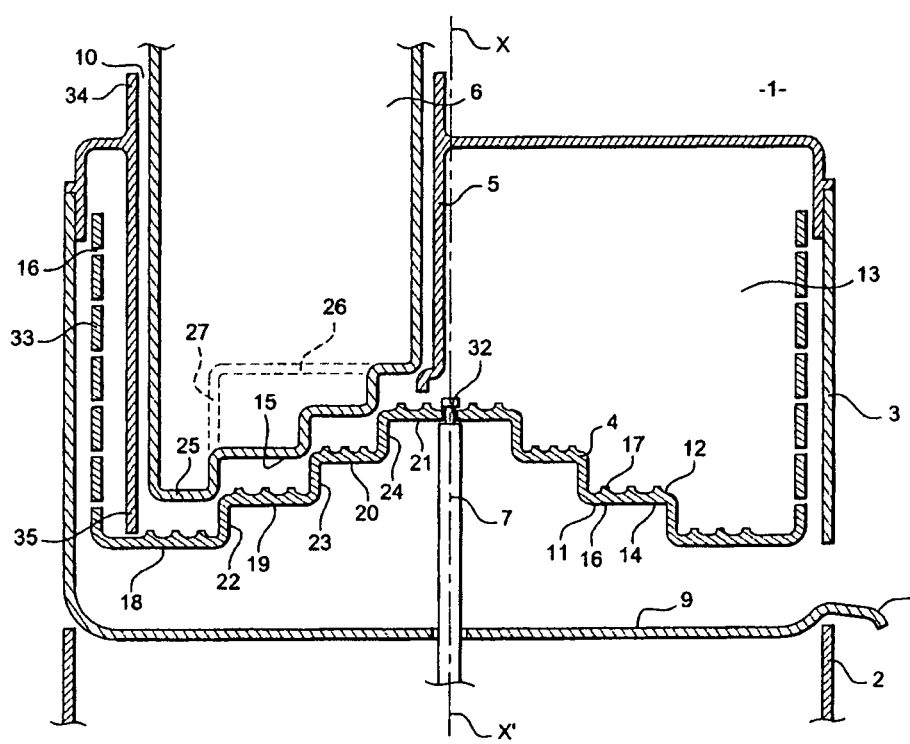
FIG. 1 shows a partial schematic representation of an extraction apparatus, according to the disclosed embodiments.

FIG. 1 illustrates a juice extractor 1oran extraction apparatus which is adapted for extracting the juice and the pulp of vegetable products, essentially fruits and vegetables. The juice extractor 1 comprises a base 2, a tank 3, a strainer 4, an entry spout 5 for vegetable products and a food pusher 6. The base 2 encloses an electric motor 50 from which extends a rotating drive shaft 7; the drive shaft 7 extends outside of the base 2. The tank 3 is distinctly cylindrical and forms a hollow recipient. The tank 3 is fixed on the base 2 and is transpierced by the drive shaft 7. The strainer 4 is also distinctly cylindrical with a symmetrical X-X' axis and forms a hollow recipient which is suspended in the tank 3. The strainer 4 is suspended in the tank 3 being supported and spun around by the drive shaft 7. The vegetable products are introduced through the spout 5 to then be pressed against the strainer 4 using the food pusher 6 with a view to extracting the juice of these products. The food pusher 6 comprises a shape which is complementary to a shape of the spout 5. The tank 3 and the strainer 4 are coaxial.

More precisely, the strainer 4 forms a round, hollow recipient. The strainer presents a radial wall 33 and a bottom 11. The radial wall 33 extends from the bottom, parallel to the X-X' axis and around the same axis. Holes 16 are made through the radial wall 33 of the strainer 4 in such a way as the holes open into the tank 3 through the radial wall 33 of the strainer 4, from the cavity 13 of the strainer 4 towards the outside of the strainer 4. The bottom 11 of the strainer 4 forms a solid disk and is a part of the strainer 4 against which the products for processing are pressed. The strainer 4 comprises a central hub (not shown) for cooperation with the drive shaft 7. The bottom 11 presents a product contact surface or extraction surface 12 surrounding in part a cavity 13 of the strainer 4. The bottom 11 also presents an external surface 14 facing towards the tank 3. The food pusher 6 presents another product contact surface or pressing surface 15. The extraction surface 12 and the pressing surface 15 are designed to be positioned face to face. The extraction surface 12 and the pressing surface 15 are face to face.

The bottom 11 of the strainer 4 presents the means of shredding 17. These means of shredding 17 are formed by the extraction surface 12 and are presented in the form of serrations 17. Each serration forming a local elevation towards the spout 5 of a part of the extraction surface 12. These serrations 17 are sharp. The group of these serrations 17 permits the shredding of vegetable products when they are pressed against the strainer 4, on the extraction surface 12.

The products are introduced into the apparatus through an upper end 34 of the spout which is opposite to a lower end 35 and fall onto the bottom 11 of the strainer 4. The food pusher 6 is then inserted in the spout 5 in order to the press the products against the serrated bottom 11.

More precisely, the products introduced into the cavity 13 of the strainer 4 are shredded by the bottom 11 of the strainer 4 and are pressed against the radial wall 33 by the centrifugal force. A part of the juice comes out of the products due to the action of this force and passes through the holes 16 in the radial wall 33. A part of the pulp of the fruit also passes through the holes 16. The remaining part of the products forms a layer or residue 28 which grows in thickness according to the quantity of product which is introduced. This residue 28 is spun around with the strainer 4.

The juice is then collected in the tank 3 underneath the strainer 4. The juice can be extracted from the tank 3 by running the juice from the tank 3 through a slow emptying lateral opening 8 of a tilted lip, the lateral opening 8 being set in a lateral wall of said tank 3 and situated in a place close to a bottom 9 of the tank 3. The bottom 9 of the tank 3 is situated in a part of the tank 3 which is close to the base 2 and which is distanced from a food product entry 10 of the spout 5.

The distance between the spout 5 and the bottom 11 of the strainer 4 is sufficiently small to ensure that the products cannot escape from the spout 5 without being shredded by the serrated bottom 11.

The fact that the juice extractor 1 is in an operational position signifies that it is sitting on a work table or a flat surface in such a way as to be used for the end for which it was designed. It is in relation to a juice extractor in operational position that we consider the lateralisation in this description. In this description we consider that in operational position, the tank 3 is fixed on the base 2. In normal operational position, the symmetrical X-X' axis is positioned perpendicularly in relation to a flat surface on which the work table extends.

According to the disclosed embodiments, the bottom 11 of the strainer 4 is stair-shaped. The term stair-shaped is understood to mean that the bottom 11 of the strainer 4 comprises several levels. A given level is a part of the bottom 11 of the strainer 4 extending circularly in relation to the X-X' axis, on a flat surface which is relatively parallel to the flat surface of the work table and which is situated at a given height in relation to the work surface. A given height is measured along the length of an axis which is parallel to the X-X' axis. The X-X' axis goes through a centre 32 of the strainer 4.

In the example in FIG. 1, the bottom 11 comprises four different levels. But the bottom 11 can comprise only two levels (example not shown). In the cross section in FIG. 1, the bottom 11 comprises a first level 18, and second level 19, a third level 20 and a fourth level 21. Each of these levels extends according to a diameter which is different from one level to another. The first level 18, the second level 19, the third level 20 and the fourth level 21 are situated at heights which are different from each other and in relation to the flat surface of the work table, the fourth level 21 being that which is situated the furthest away in relation to the flat surface of the work table. The bottom 11 of the strainer 4 also comprises at least a part of the liaison designed to link two given levels.

In the case of FIG. 1, the first level 18 is linked to the second level 19 by a first portion of the liaison 22. The second level 19 is linked to the third level by a second portion of the liaison 23. The third level 20 is linked to the fourth level 21 by a third part of the liaison 24. Each of these portions of the liaison 22, 23 and 24 extend circularly around the X-X' axis. Each of these portions of the liaison can extend perpendicularly in relation to the flat surface of the work table. Or indeed, each of these portions of the liaison can extend along a flat surface which is inclined in relation to the flat surface of the work table.

In the example in FIG. 1, the bottom 11 of the strainer 4 is globally conical. According to the same example, a narrowest section of the cone is situated in a place close to the entry 10 of the spout. The first level 18 is closer to the tank 3 than the fourth level 21.

According to the disclosed embodiments, the pressing face 15 of the food pusher 6 can be of a shape that is complementary to the shape of the bottom 11 of the strainer 4, FIG. 1. In effect, the food pusher 6 also forms four other levels in correspondence with the four levels 18, 19, 20 and 21 of the bottom 11 of the strainer 4, FIG. 1.

In another example in FIG. 2, the pressing face 15 of the food pusher 6 can comprise only two levels with a first level 25 and a second level 26, the second level 26 being represented by dotted lines. The shape of the first level 25 of the food pusher 6 is complementary to the shape of the first level 18 of the bottom 11 of the strainer 4. The second level 26 extends along a flat surface which is relatively parallel to the work surface of the juice extractor and covers the three other levels of the strainer. A portion of the liaison 27 of the food pusher also links the first level 25 to the second level 26. This portion 27 can extend perpendicularly in relation to the flat surface of the work table or it can extend in a way which is inclined in relation to the same flat surface. The first level 25 of the food pusher 6 is closer to the bottom 11 of the strainer 4 than the second level 26 of the food pusher 6.

The processing of the product 30 by the juice extractor, according to the disclosed embodiments, is illustrated by FIGS. 2a to 2c. As and when the product 30 is pressed against the bottom 11 of the strainer 4 by the food pusher 6, the product 30 disappears from the fourth level 21 and the third level 20, FIGS. 2a to 2b. Then, the product 30 disappears from the second level 19, FIGS. 2b to 2c. At the end of processing, all that is left is a residue 28 of the product situated on the last level or first level 18, the residue 28 being the last part of the product 30 which cannot be processed because of the room for manoeuvre which exists between the food pusher 6 and the strainer 4. The residue 28 is of a width inferior or equal to another width of the level on which it is supposed to remain, the width and the other width being both measured along the length of an axis which is perpendicular to the X-X' axis.

The bottom of the strainer can be ascending or descending. In general, whether the bottom 11 of the strainer 4 is ascending or descending, the obtained residue 28 is always situated on the level of the bottom 11 of the strainer 4 situated closest to the base.

The strainer 4 can be made from a material which is of a steel, aluminium or stainless steel type. The strainer 4 can be made by coining or by shaping.

The food pusher 6 can be made in a plastic material and by molding.

The invention claimed is:

1. An apparatus for extraction of juice and pulp from a food product comprising:
a base enclosing an electric motor from which extends a rotating drive shaft,
a tank fixed on the base and transpierced by the drive shaft,
an entry spout for the food product,
a strainer set in the tank and being supported and spun by the drive shaft, the strainer comprising a radial wall perforated by several holes and a solid bottom, the wall of the strainer extending around an axis of symmetry, such that the food product is in contact with the bottom and the wall and passes through the holes, and
a food pusher which can be inserted in the spout, the food product being held against the bottom of the strainer by the food pusher in order to extract juice from the food product, wherein the juice is collected in at least a portion of the tank situated underneath the strainer,
wherein the bottom of the strainer comprises at least two levels horizontal to the base, in the shape of an ascending or descending staircase, each level presenting means of shredding the food product, said means being in the form of serrations, and
wherein the food pusher has a pressing face in a shape of an ascending or descending staircase, comprising at least two levels, said shape being complementary to a shape of the bottom of the strainer, the pressing face also being a surface designed to be in contact with the food product.

2. The apparatus of claim 1, wherein the bottom of the strainer comprises a globally conical shape, a narrowest section of the conical shape situated on a part of the bottom close to an entry of the spout.

* * * * *